US012743079B2

(12) United States Patent
Maier et al.

(10) Patent No.: US 12,743,079 B2
(45) Date of Patent: Sep. 22, 2026

(54) MAINTENANCE INDICATOR

(71) Applicant: CERATIZIT Besigheim GmbH, Besigheim (DE)

(72) Inventors: Jens Maier, Besigheim (DE); Sophie Müller, Besigheim (DE); Daniel Dos Santos Batista, Kempten (DE); Kai Reichert (née Gellert), Besigheim (DE); Markus Mack, Besigheim (DE)

(73) Assignee: CERATIZIT Besigheim GmbH, Besigheim (BE)

(*) Notice: Subject to any disclaimer, the term of this patent is extended or adjusted under 35 U.S.C. 154(b) by 100 days.

(21) Appl. No.: 18/700,842

(22) PCT Filed: Aug. 30, 2022

(86) PCT No.: PCT/EP2022/074003
§ 371 (c)(1),
(2) Date: Apr. 12, 2024

(87) PCT Pub. No.: WO2023/061655
PCT Pub. Date: Apr. 20, 2023

(65) Prior Publication Data

US 2025/0238028 A1 Jul. 24, 2025

(30) Foreign Application Priority Data

Oct. 12, 2021 (EP) .................................... 21202049

(51) Int. Cl.
*G05B 23/02* (2006.01)

(52) U.S. Cl.
CPC ....... *G05B 23/027* (2013.01); *G05B 23/0272* (2013.01)

(58) Field of Classification Search
CPC .......................... G05B 23/027; G05B 23/0272
(Continued)

(56) References Cited

U.S. PATENT DOCUMENTS

2006/0069459 A1* 3/2006 Retlich .............. G05B 23/0216 700/28
2018/0004196 A1* 1/2018 Kawai ................. G05B 19/409
(Continued)

FOREIGN PATENT DOCUMENTS

DE 102017117397 A1 2/2019
EP 1339014 A1 8/2003
(Continued)

OTHER PUBLICATIONS

Ostasevicius V et al.: "Monitoring the condition of the cutting tool using self-powering wireless sensor technologies", Jun. 9, 2016, The International Journal of Advanced Manufacturing Technology, Springer, London, vol. 88, No. 9, pp. 2803-2817 (Year: 2016).*
(Continued)

*Primary Examiner* — Naomi J Small
(74) *Attorney, Agent, or Firm* — Laurence A. Greenberg; Werner H. Stemer; Ralph E. Locher

(57) ABSTRACT

A maintenance indicator stores an information bit string. The information bit string encodes at least a section of a piece of maintenance information of a component of a cutting tool in binary. The information bit string has a plurality of information bits. Each information bit has an information bit state. In an activated display state, the maintenance indicator emits flashes that follow the information bit states of the information bit string and thus displays an information signal. In the activated display state, the maintenance indicator displays an announcement signal. The announcement
(Continued)

signal announces the information signal. The information signal can be filmed by a photosensitive element while maintaining an air gap.

15 Claims, 5 Drawing Sheets

(58) Field of Classification Search
USPC .......................................................... 340/331
See application file for complete search history.

(56) References Cited

U.S. PATENT DOCUMENTS

2019/0310620 A1* 10/2019 Kamiguti ............ G06F 11/0766
2025/0292168 A1* 9/2025 Hahn ................. G06Q 10/0833

FOREIGN PATENT DOCUMENTS

EP 3689535 A1 8/2020
GB 2185130 A 7/1987

OTHER PUBLICATIONS

Chang Shin-Yi et al., "Greendicator: Enabling Optical Pulse-Encoded Data Output from WSN for Display on Smartphones", Sep. 1, 2014, 2014 IEEE International Conference On Internet Of Things (IThings), pp. 381-388 (Year: 2014).*

Geppert, Eveline "Tool process data logging black box for tools:", Jan. 1, 2005 (Jan. 1, 2005), XP055153798, URL: https://www.plastverarbeiter.de/wp-content/uploads/migrated/docs/1271_29835.pdf, [found on Nov. 18, 2014], PLASTVERARBEITER, 56. (2005) No. 4 79.

Chang, et al. "Greendicator: enabling optical pulse-encoded data output from WSN for display on smartphones." 2014 IEEE International Conference on Internet of Things (iThings), and IEEE Green Computing and Communications (GreenCom) and IEEE Cyber, Physical and Social Computing (CPSCom). IEEE, 2014.

Ostasevicius, et al. "Monitoring the condition of the cutting tool using self-powering wireless sensor technologies." The International Journal of Advanced Manufacturing Technology 88.9 (2017): 2803-2817.

* cited by examiner

MAINTENANCE INDICATOR

FIELD AND BACKGROUND OF THE INVENTION

The present invention relates to a maintenance indicator, wherein the maintenance indicator stores an information bit string, wherein the information bit string encodes at least a section of a piece of maintenance information of a component of a cutting tool in binary.

EP 3 689 535 A1 discloses an information device for providing information about the maintenance state of a cutting tool.

With regards to the information device known from EP 3 689 535 A1, there is the need to reduce in terms of area the region used to display the maintenance information such that the maintenance information can also be displayed in tight conditions on a cutting tool or in poorly accessible conditions.

SUMMARY OF THE INVENTION

The object of the present invention consists in the provision of a maintenance indicator which displays maintenance information with minimum space requirements.

The technical problem of the present invention is solved by the subject matter of the independent claim 1. Advantageous developments of the invention can be gathered from the dependent claims, which are combinable among themselves without restrictions, the description and the figures.

According to the present invention, a maintenance indicator is provided, wherein the maintenance indicator stores an information bit string, wherein the information bit string encodes at least a section of a piece of maintenance information of a component of a cutting tool in binary, wherein the information bit string has a plurality of information bits, wherein each information bit has an information bit state, wherein, in an activated display state, the maintenance indicator emits flashes that follow the information bit states of the information bit string and thus displays an information signal, wherein, in the activated display state, the maintenance indicator displays an announcement signal, wherein the announcement signal announces the information signal, wherein the information signal can be filmed by a photosensitive element while maintaining an air gap.

The information signal can be filmed by the photosensitive element while maintaining the air gap, especially when the maintenance indicator is sufficiently still relative to the photosensitive element, for example a conventional smartphone camera, such that the information bit states can be optically distinguished, i.e. do not optically blur due to a movement of the maintenance indicator that is too fast.

The maintenance indicator transmits the information signal and hence the information bit string time-serially, i.e. one information bit state after the other in time, by virtue of the maintenance indicator emitting flashes that follow the information bit states of the information bit string. Hence, the region required to display the information signal is kept small. Thus, a luminous element which depending on the information bit states switches back and forth, in particular on and off, so that the luminous element has a first luminous state in a first switching state and a second luminous state in a second switching state is already sufficient for displaying the information signal. In the context, it is conceivable and also possible that the luminous element is also used to display the announcement signal; this saves even more space.

A particular advantage of the maintenance indicator is that the information signal can be filmed and hence electronically decoded by the photosensitive element, i.e. an element which creates electrical signals when excited by light waves. This is because this allows the at least one section of the piece of maintenance information to be rendered directly understandable by a human on the basis of the information signal, allowing them to make a decision as to whether or not the component of the cutting tool requires maintenance.

The announcement signal notifies a receiver comprising the photosensitive element that the information signal, and hence the information bit string, are displayed next. This ensures that the receiver knows when the signals received thereby are part of the information signal and hence part of the information bit string. The probability of an artifact incorrectly being identified as an information signal is consequently low because only those signals received after the notification signal are accepted on the part of the receiver.

Moreover, the announcement signal can be understood by the receiver to the effect of the intention being to reconstruct the information bit string from the information signal. Thus, the decoding process is put into motion without requiring further signals to this end.

In this context, "emits flashes that follow the information bit states" means that the maintenance indicator successively reads in the information bit states of the information bit string and is set into a first luminous state or second luminous state depending on the read-in information bit state. Thus, the first luminous state can be triggered by virtue of the read-in information bit state being assigned to a logical zero and the second luminous state by virtue of the read-in information bit state being assigned to a logical one, or vice versa. Each luminous state has the same pulse duration.

The first luminous state can also be attained by virtue of the maintenance indicator being actively non-luminous if, by contrast, the maintenance indicator is actively luminous in the second luminous state, or vice versa.

The luminous states can be distinguished in terms of their luminous color or luminous intensity such that each luminous state is assignable either to a logical "zero" or a logical "one" on the basis of its luminous color or luminous intensity. The luminous color might also correspond to white light.

For example, the information bit string can be represented as follows as an 8 bit string of logical zeros and ones: 01011101, whereupon the maintenance indicator for example emits flashes as follows: first luminous state, second luminous state, first luminous state, second luminous state, second luminous state, second luminous state, first luminous state, second luminous state. This temporal sequence of the luminous states can be filmed by the photosensitive element and the sequence of luminous states filmed thus, i.e. the information signal, can be used to reconstruct the information bit string given an information bit reading clock. Consequently, the reconstructed information bit string can be decoded into the at least one section of the piece of maintenance information given a binary code.

For example, the piece of maintenance information of the component of the cutting tool can in each case be a service life of the component, a completed number of movement cycles of the component or a power storage state of the component.

For example, the piece of maintenance information can be "100 hours service life". In this example, the information bit string encodes at least one section of this piece of maintenance information, i.e. for example the number "100", the word "hours" or the phrase "service life", into a binary code, for example into the ASCII code. The maintenance indicator then emits flashes that follow the information bit states of the number "100" encoded in binary, of the word "hours" encoded in binary, or of the phrase "service life" encoded in binary, with the result that the information bit string and hence the section of the piece of maintenance information encoded in binary in this example can be reconstructed from the information signal and consequently be decoded into an alphanumeric code, i.e. Latin letters and Arabic numerals.

The announcement signal can be filmed by the photosensitive element in a manner analogous to the information signal, and so the announcement signal appears prior to the information signal in a common video recording and hence announces the information signal.

The maintenance indicator can display the announcement signal by virtue of the maintenance indicator emitting flashes that follow an announcement bit string. In this case, the maintenance indicator emitting flashes that follow the announcement bit string should be understood in a manner analogous to the maintenance indicator emitting flashes that follow the information bit string, with the announcement bit string being chosen such that the sequence of bit states contained in the announcement bit string is not contained in the information bit string. As a result, the receiver is able to even better identify that the announcement signal is not encoding a piece of maintenance information but announcing the information transmission.

While maintaining the air gap, the information signal can be transmitted outside of a data cable, including a fiber-optic cable, and hence be filmed in such a way by the photosensitive element that the information signal can be filmed, and thus decoded, particularly flexibly in terms of space and with little outlay.

In terms of the magnitude, the air gap can be in the range from 0.1 m to 2 m, in each case measured in relation to the region of the maintenance indicator displaying the information signal.

According to a development of the maintenance indicator, the latter creates a warning signal once the piece of maintenance information has reached a specified information content. The warning signal informs humans directly that the piece of maintenance information has reached the specified information content; this is in contrast to the information signal whose information content is only able to be registered directly by humans once the information signal and hence the information bit string was decoded into a code readable by humans, for example into an alphanumeric code containing Latin letters and Arabic numerals. The specified information content of the piece of maintenance information may relate to a specified service life of the component, a specified number of completed movement cycles of the component, in particular revolutions in relation to an axis of rotation or insertion and removal processes in relation to a drilled hole, or a specified power storage state of the component, or any desired combination of these parameters.

For example, the warning signal is created by the maintenance indicator once the component of the cutting tool has reached 5000 operating hours or operating cycles, for example.

The warning signal can be an optical, acoustic or haptic signal.

The maintenance indicator preferably creates the warning signal on its own accord, without the activated display state being required to this end.

According to a development of the maintenance indicator, the latter displays the warning signal at least partially in the visible wavelength range. Such a warning signal can be registered particularly well by humans in an environment characterized by machine noises. The visible wavelength range of the light is in the range from approximately 380 nm (violet light) to approximately 780 nm (red light), preferably from 380 nm to 780 nm. It is also conceivable and possible that the warning signal is displayed as white light. A luminous element provided for the display of the information signal can be used to display the warning signal such that the warning signal is displayed in particularly space-saving fashion. In an alternative or in addition, a further luminous element can also be used to display the warning signal.

According to a development of the maintenance indicator, the warning signal has a specified warning duration, with the warning duration being longer than a specified information signal duration for the information signal. As a result, the warning signal differs particularly clearly from the information signal, allowing humans to register the warning signal even more easily in terms of its warning character.

According to a development of the maintenance indicator, the latter, in the activated display state, emits flashes that follow an information bit reading clock, wherein the information bit string is reconstructible from the information signal given the information bit reading clock. As a result, the maintenance indicator specifies the clock at which the information bits of the information bit string are to be read by a receiver containing the photosensitive element. A further luminous element can be used to display the information bit reading clock, while a luminous element that differs from the further luminous element is used to display the information signal in that case. By preference, the maintenance indicator emits flashes in the visible wavelength range that follow the information bit reading clock such that the information bit reading clock can be filmed particularly well by the photosensitive element.

According to a development of the maintenance indicator, the latter comprises a luminous element and a further luminous element, wherein, in the activated display state, in each case the luminous element emits flashes that follow the information bit states of the information bit string and the further luminous element emits flashes that follow the information bit reading clock. This ensures that the information signal can be distinguished better from the information bit reading clock.

According to a development of the maintenance indicator, the latter comprises the photosensitive element, wherein the photosensitive element maintains the air gap from an indicator region of the maintenance indicator, wherein the indicator region is designed and arranged to display the information signal. This increases the operational readiness of the maintenance indicator. The photosensitive element can be integrated particularly cost-effectively and easily in various mobile communication devices or is usually already present therein, for example in a conventional smartphone (cellular telephone). For example, the indicator region is formed by a luminous element which displays the information signal.

According to a development of the maintenance indicator, the latter comprises the component of the cutting tool, or the maintenance indicator is the component of the cutting tool. The component of the cutting tool can relate to a main body of a drill, a mill or a thread cutter; in the case of the main body of the thread cutter, the main body is a chuck for receiving a thread cutter element. If the maintenance indicator is the component of the cutting tool, then the maintenance indicator is for example fastened to one of the aforementioned main bodies in reversibly detachable fashion and is accordingly moved together with the main body, be this linearly and/or rotationally.

According to a development of the maintenance indicator, the latter comprises a magnet-sensitive activation sensor, wherein the indication state of the maintenance indicator is set when a magnetic field of a permanent magnet penetrates into the activation sensor and exceeds a specified magnetic field strength. As a result, the indication state of the maintenance indicator can be set contactlessly, improving the use of the maintenance indicator even more in tight conditions on a cutting tool or in poorly accessible conditions. By preference, the maintenance indicator comprises the permanent magnet, increasing the operational readiness of the maintenance indicator.

According to a development of the maintenance indicator, the latter stores a further information bit string, wherein the further information bit string encodes at least one further section of the piece of maintenance information from the component of the cutting tool in binary, wherein the further information bit string has a plurality of further information bits, wherein each further information bit has an information bit state, wherein, in the activated display state, the maintenance indicator emits flashes that follow the information bit states of the further information bit string and thus displays a further information signal after the information signal, wherein the further information signal can be filmed by the photosensitive element while maintaining the air gap. According to this development, a further section of the piece of maintenance information is transferred in the information signal, and so the maintenance indicator transmits a plurality of sections of the piece of maintenance information.

According to a development of the maintenance indicator, the latter, in the activated display state, repeatedly displays the announcement signal, wherein the repeatedly displayed announcement signal announces the further information signal. Thus, the repeatedly displayed announcement signal is displayed after the information signal and prior to the further information signal. The advantages described for the announcement signal in relation to the information signal are hence also realized in relation to the further information signal.

According to a development of the maintenance indicator, the latter stores an announcement bit string, wherein the announcement bit string has a plurality of announcement bits, wherein each announcement bit has an announcement bit state, wherein, in the activated display state, the maintenance indicator displays the announcement signal by virtue of the maintenance indicator emitting flashes that follow the announcement bit states of the announcement bit string. Thus, the announcement signal is displayed in a manner analogous to the information signal, by virtue of the maintenance indicator emitting flashes.

By preference, the announcement bit string and the information bit string are encoded according to the same binary code, for example according to the ASCII code, with the decoded announcement bit string differing from the decoded information signal. Thus, the decoded announcement bit string may encode a non-printable character according to the ASCII code, i.e. a character which is not a letter, not a numeral and not a blank character, but is from among the control characters of the ASCII code, i.e. for example “carriage return”, “delete”, “syn”, etc. If the announcement bit string is from among the control characters of the ASCII code, then the announcement signal can be distinguished even better from the information signal because control characters do not contain any information relevant to the maintenance of the component of the cutting tool.

According to a development of the maintenance indicator, the latter, in the activated display state, displays the information signal at least partially in the visible wavelength range. As a result, humans are able to register directly that the information signal is displayed or the maintenance indicator is even active. Moreover, the sensitivity of the photosensitive element is usually greater within the visible wavelength range than outside said wavelength range. The visible wavelength range of the light is in the range from approximately 380 nm (violet light) to approximately 780 nm (red light), preferably from 380 nm to 780 nm. It is also conceivable and possible that the information signal is displayed, at least in part, as white light.

According to a development of the maintenance indicator, the latter, in the activated display state, displays the announcement signal at least partially in the visible wavelength range. As a result, humans are able to register directly that the announcement signal is displayed. Moreover, the sensitivity of the photosensitive element is usually greater within the visible wavelength range than outside said wavelength range. The visible wavelength range of the light is in the range from approximately 380 nm (violet light) to approximately 780 nm (red light), preferably from 380 nm to 780 nm. It is also conceivable and possible that the announcement signal is displayed, at least in part, as white light.

According to a development of the maintenance indicator, the latter comprises an acceleration sensor, wherein the acceleration sensor is designed and arranged to measure a rotational acceleration and/or a linear acceleration, wherein the magnitude of the acceleration is in the range from 15 m/s2 to 7500 m/s2, wherein the maintenance indicator is designed and arranged such that the maintenance indicator creates the at least one section of the piece of maintenance information on the basis of a minimum acceleration measured by the acceleration sensor, wherein the acceleration sensor is embedded in a plastics mass, wherein the maintenance indicator comprises the plastics mass. According to this development, the maintenance indicator automatically stores the piece of maintenance information only once the acceleration of the component of the cutting tool is in the range from 15 m/s2 to 7500 m/s2, i.e. this component experiences a certain to relatively high acceleration. This ensures that the piece of maintenance information is only stored in updated fashion if the maintenance state of the component is expected to change.

In addition or in an alternative, the maintenance indicator is designed such that the piece of maintenance information is only stored automatically once the component is moved so as to follow a given movement pattern during the acceleration. The movement pattern represents a movement of the component during a cutting operation specified by the cutting tool, for example by virtue of the cutting tool being moved so as to follow a trajectory and/or being rotated so as to rotate in relation to an axis of rotation. For example, the trajectory fits a linear back and forth movement of a grinding tool, which thus cuts using geometrically undetermined cutting bodies, or to a thread cutter when moving into and out of a drilled hole, while the rotation fits to a drilling or milling tool which is rotated in relation to the axis of rotation in each case.

Further advantages and utilities of the invention emerge from the following description of exemplary embodiments with reference to the attached figures.

DETAILED DESCRIPTION OF THE INVENTION

Figure 1:
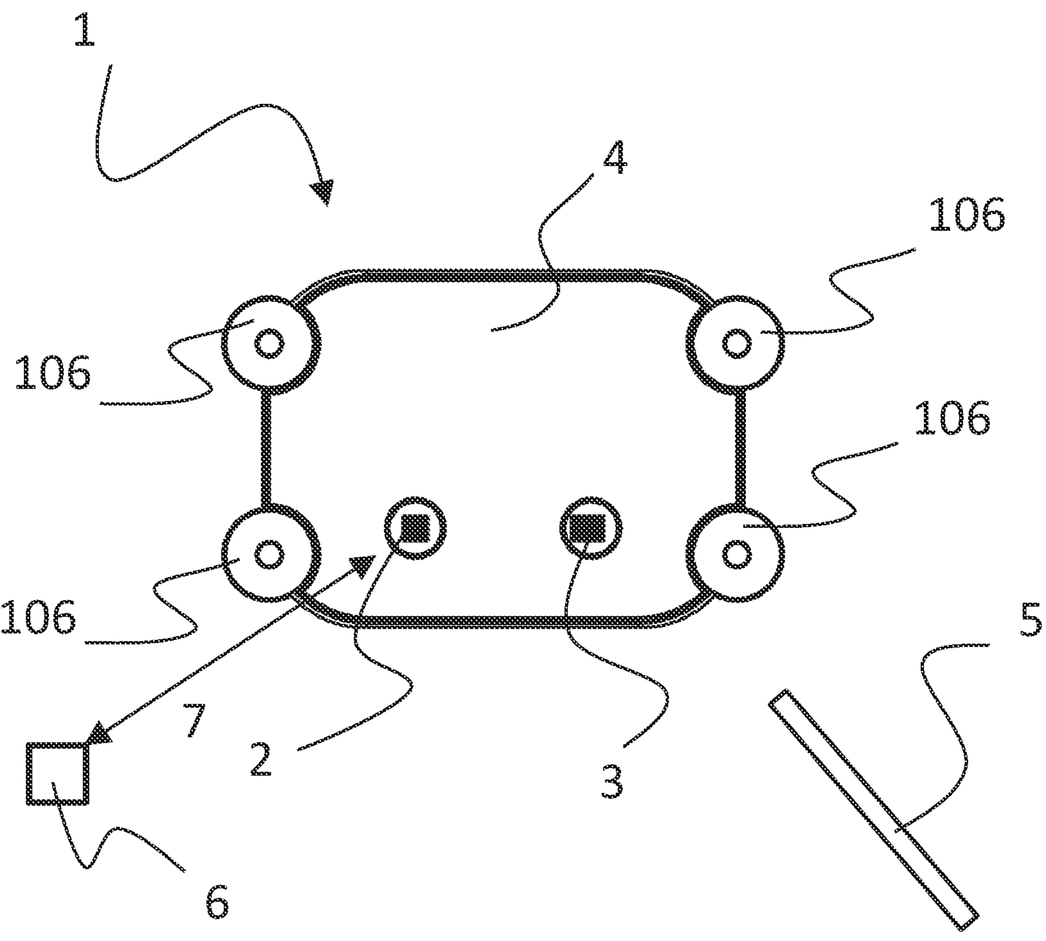
FIG. 1: shows a front side view of a schematically illustrated maintenance indicator according to one embodiment.

FIG. 1 shows a plan view of a maintenance indicator 1. The maintenance indicator 1 comprises a data light-emitting diode 2 and a clock light-emitting diode 3. The data light-emitting diode 2 and the clock light-emitting diode 3 each interrupt a housing 4 of the maintenance indicator 1, with the result that the respective luminous states of the data light-emitting diode 2 and the clock light-emitting diode 3 are visible from the outside.

A display state of the maintenance indicator 1 is set, i.e. activated, if a permanent magnet 5 is brought into the proximity of the maintenance indicator 1 such that a magnet-sensitive sensor of the maintenance indicator 1 registers the magnetic field of the permanent magnet 5 at a specified magnetic field strength; the magnet-sensitive sensor and further components of the maintenance indicator 1 will be discussed in detail with reference to FIG. 3.

In the activated display state of the maintenance indicator 1, the clock light-emitting diode 3 emits flashes that follow an information bit reading clock by virtue of the clock light-emitting diode 3 being switched on and off periodically. The clock light-emitting diode 3 shines with red visible light when the clock light-emitting diode 3 is switched on. However, it is also conceivable and possible that the clock light-emitting diode 3 shines with any other desired color from the visible light wavelength range.

In the activated display state, the data light-emitting diode 2 emits flashes that follow the information bit states of an information bit string by virtue of each information bit state of the information bits in the information bit string successively switching the data light-emitting diode 2 on for one pulse duration if the information bit state is assigned to a logical "1" or off for one pulse duration of the same absolute length if the information bit state is assigned to a logical "0". In this way, the data light-emitting diode 2, and hence the maintenance indicator 1, displays an information signal from which the information bit string is reconstructible given the information bit reading clock which is displayed by the clock light-emitting diode 3 by virtue of the latter emitting flashes.

The data light-emitting diode 2 shines with green visible light when the data light-emitting diode 2 is switched on. However, it is also conceivable and possible that the data light-emitting diode 2 shines with any other desired color from the visible light wavelength range, in particular differently to the clock light-emitting diode 3.

Prior to the data light-emitting diode 2 emitting flashes that follow the information bit states of the information bit string, the data light-emitting diode 2 emits flashes that follow the announcement bit states of an announcement bit string by virtue of each announcement bit state of the announcement bit string successively switching the data light-emitting diode 2 on for one pulse duration if the announcement bit state is assigned to a logical "1" or off for one pulse duration of the same absolute length if the announcement bit state is assigned to a logical "0". The pulse duration assigned to each bit state has the same length for the announcement bit string and the information bit string.

The information bit string and the announcement bit string are each assigned to a character of the 8-bit ASCII code (American Standard Code for Information Interchange). The ASCII code is a binary code which encodes 128 characters in binary; thus, 7 bits of the 8 bits are used for the respective character, of which 33 are non-printable and 95 are printable.

Thus, the characters of the ASCII code correspond to a seven digit sequence of zeros and ones, with this sequence always being preceded by a zero such that the sequence contains 8 bits. Each eight digit sequence of a zero followed by zeros and ones is usually converted into a decimal number or hexadecimal number, and thus sorted ascendingly in the ASCII code table, with the result that each of these numbers is assigned a respective character of the ASCII code and hence the associated bit string. For example, the upper case "S" has the bit string 01010011 in the ASCII code and is sorted under the decimal number 53 or under the hexadecimal number 83 (in the field of data codes, hexadecimal numbers are usually preceded by the prefix "0×", and so the hexadecimal number 83 is then represented by 0×83).

The printable characters in the ASCII code include upper case and lower case letters of the Latin alphabet, the ten Arabic numerals 0 to 9 and punctuation marks and special characters, including the blank character. The printable characters are arranged according to the decimal numbers 32 to 47 (special characters), 58 to 64 (special characters), 91 to 96 (special characters), 123 to 126 (special characters), 48 to 57 (numerals), 65 to 90 (letters) and 97 to 122 (letters).

The non-printable characters include the control characters. The control characters usually serve to encode text control commands within a data code, for example line breaks or tabs. The non-printable characters are arranged according to decimal numbers 0 to 31 and 127 in the ASCII code.

The information bit string of the maintenance indicator 1 encodes a printable character from the ASCII code and thus encodes, in binary, a section of a piece of maintenance information, for example a letter, a numeral or a blank character, from the component 100 shown in FIG. 5; the component 100 will be discussed in detail with reference to FIG. 5.

By way of example, the piece of maintenance information contains the information content "2424 Betriebszyklen" [2424 operating cycles], i.e. the four numerals 2, 4, 2, 4, a blank character and the 14 letters B, e, t, r, i, e, b, s, z, y, k, l, e, n. Thus, 19 information bit strings are required for these 19 sections of the piece of maintenance information in order to display the entire piece of maintenance information by way of the described flashing by the data light-emitting diode 2.

The maintenance indicator 1 is able to store these information bit strings and any other information bit strings, each of the exemplary length of 8 bits, according to the ASCII code and can cause the data light-emitting diode 2 to emit flashes as described such that all sections of the piece of maintenance information can also be displayed.

The announcement bit string encodes a non-printable character of the ASCII code in the embodiment of the maintenance indicator 1 shown in FIG. 1, with the result that a decoding of the announcement bit string is not understood incorrectly as a section of the piece of maintenance information.

A photosensitive element 6, for example a CCD chip (charge-coupled device chip) or a CMOS chip (complementary metal-oxide semiconductor chip), is depicted as a box in FIG. 1 by way of example and, while maintaining an air gap 7, films the announcement signal displayed by the flashing of the data light-emitting diode 2 and the information signal displayed after the announcement signal by the continued flashing of the data light-emitting diode 2. While the photosensitive element 6 films the information signal and the announcement signal, the photosensitive element also films the flashing of the clock light-emitting diode 3; the air gap 7 is drawn in perspective and should thereby make clear that a certain distance is maintained between the data light-emitting diode 2 and the photosensitive element 6, i.e. this is unlike an optical fiber connection to the photosensitive element 6.

Figure 2:
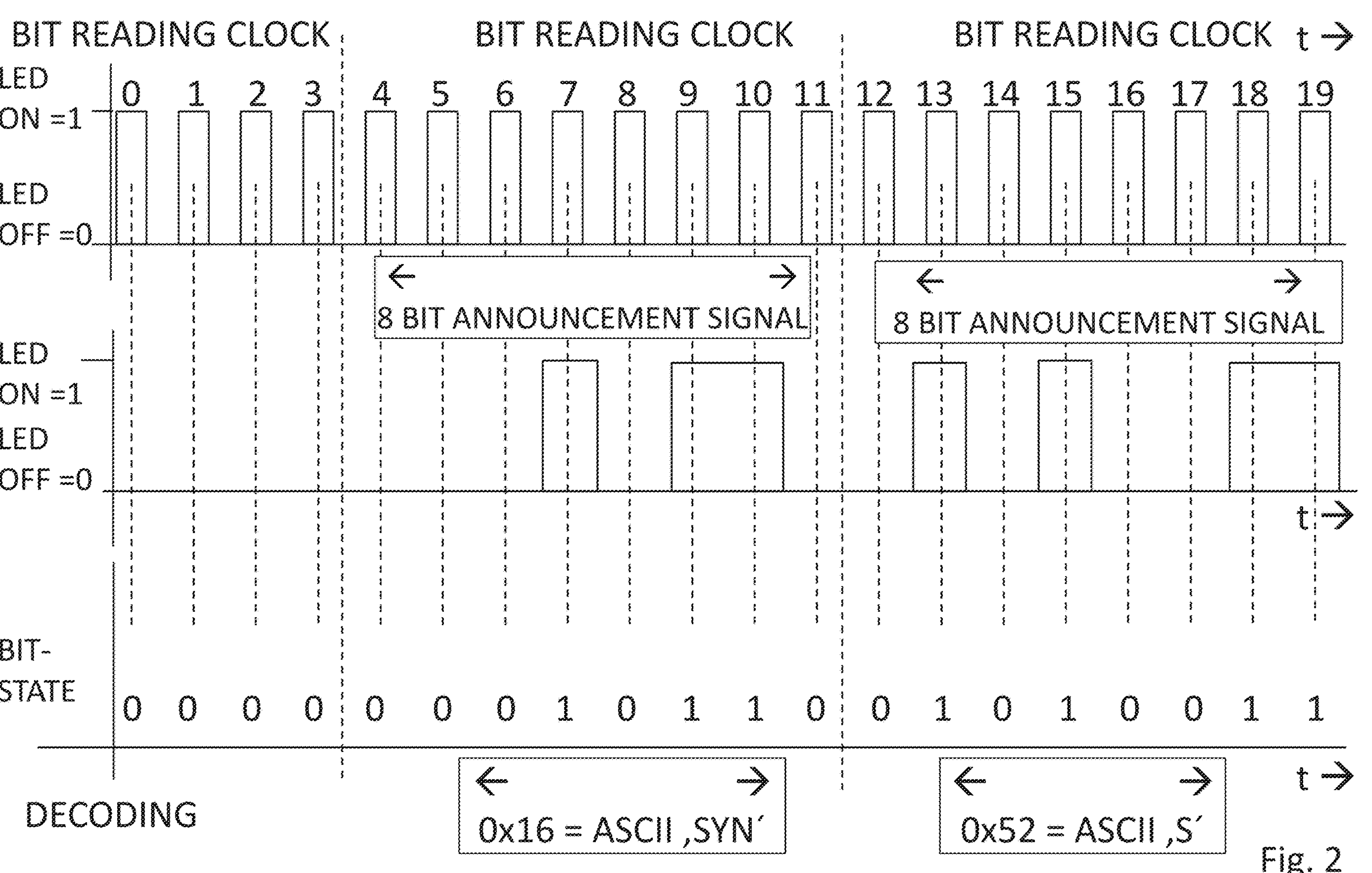
FIG. 2: shows a schematic representation of a bit reading clock, an announcement signal, an information signal, reconstructed bit states and decoded data, each as a function of time t.

The signals filmed thus by the photosensitive element 6 are each shown, by way of example, in FIG. 2 as a function of time t. The abbreviation LED is used in FIG. 2 for the term light-emitting diode.

The uppermost signal curve in FIG. 2 shows the information bit reading clock filmed by the photosensitive element 6, denoted bit reading clock in FIG. 2. When the clock light-emitting diode 3 is switched on, shown as LED ON in the uppermost signal curve in FIG. 2, then this corresponds to logical "one", i.e. LED ON=1. When the clock light-emitting diode 3 is switched off, shown as LED OFF in the uppermost signal curve in FIG. 2, then this corresponds to logical "zero", i.e. LED OFF=0. The switched-on luminous states of the clock light-emitting diode 3 depicted thus appear as rectangular signals, each of the same width, in FIG. 2 and are labeled 0 to 19 in FIG. 2 for reasons of clarity; time t also increases in this order.

The middle signal curve in FIG. 2 shows the announcement signal and information signal as filmed by the photosensitive element 6 in each case. When the data light-emitting diode 2 is switched on, shown as LED ON in the middle signal curve in FIG. 2, then this corresponds to logical "one", i.e. LED ON=1. When the data light-emitting diode 2 is switched off, shown as LED OFF in the middle signal curve in FIG. 2, then this corresponds to logical "zero", i.e. LED OFF=0. The switched-on luminous states of the data light-emitting diode 2 depicted thus appear as rectangular signals in FIG. 2.

Accordingly, FIG. 2 shows that the switched-on luminous states 0 to 3 of the clock light-emitting diode 3 are displayed prior to the announcement signal; this may serve for a clock synchronization on the part of a receiver comprising the photosensitive element 6. The switched-on luminous states 0 to 3 of the clock light-emitting diode 3 are optional, however, and so the data transfer with the maintenance indicator 1 also works without the first four information bit reading clocks.

The announcement signal is displayed in the temporal range of the switched-on luminous states 4 to 11. The announcement bit string is reconstructed from the announcement signal, for example by way of reconstruction software interacting with the photosensitive element 6, in such a way that the announcement signal curve is always assigned the bit state "1" when the data light-emitting diode 2 is switched on at the same time as the temporal middle of one of the switched-on luminous states 4 to 11. By contrast, if the data light-emitting diode 2 is switched off at the temporal middle of one of the switched-on luminous states 4 to 11, the announcement signal curve is assigned a "0".

The bit states line in FIG. 2 shows the result of the described reconstruction of the announcement bit string from the announcement signal: 00010110.

The decoding line in FIG. 2 shows the decoded announcement bit string, specifically that the announcement bit string encodes the non-printable character "SYN" (upper case), which is assigned the hexadecimal number 0×16 in the ASCII table. For example, the decoding can be performed by decoding software executably stored on the receiver comprising the photosensitive element 6.

The information signal is shown in the temporal range of the switched-on luminous states 12 to 19 in FIG. 2, i.e. after the announcement signal. The information bit string is reconstructed from the information signal, for example by way of reconstruction software interacting with the photosensitive element 6, in such a way that the information signal curve is always assigned the bit state "1" when the data light-emitting diode 2 is switched on at the same time as the temporal middle of one of the switched-on luminous states 12 to 19. By contrast, if the data light-emitting diode 2 is switched off at the temporal middle of one of the switched-on luminous states 12 to 19, the information signal curve is assigned a "0".

The bit states line in FIG. 2 shows the result of the described reconstruction of the information bit string from the information signal: 01010011.

The decoding line in FIG. 2 shows the decoded information bit string, specifically that the information bit string encodes the printable character "S" (upper case), which is assigned the hexadecimal number 0×52 in the ASCII table. For example, the decoding can be performed by decoding software executably stored on the receiver comprising the photosensitive element 6.

It is possible and also conceivable that the data light-emitting diode 2 displays a termination signal constructed analogously to the announcement signal at a time following the information signal by virtue of the data light-emitting diode 2 emitting flashes that follow the bit states of a bit string which is constructed analogously to the announcement bit string and which encodes a further or the same non-printable character.

At this point, express reference is made to the fact that a receiver comprising the photosensitive element 6 and the reconstruction software is also able to reconstruct the announcement bit string and the information bit string without the flashes by the clock light-emitting diode 3, by virtue of such a receiver recognizing the clock with which it should reconstruct the announcement bit string and the information bit string from the announcement signal and information signal, respectively, on the basis of the announcement signal.

The data light-emitting diode 2 and/or the clock light-emitting diode 3 shine continuously in the visible wavelength range if the piece of maintenance information has reached a specified information content, e.g. "200000 Betriebszyklen" [200 000 operating cycles]. In this way, the maintenance indicator 1 displays a warning signal whose meaning humans can register directly.

Figure 3:
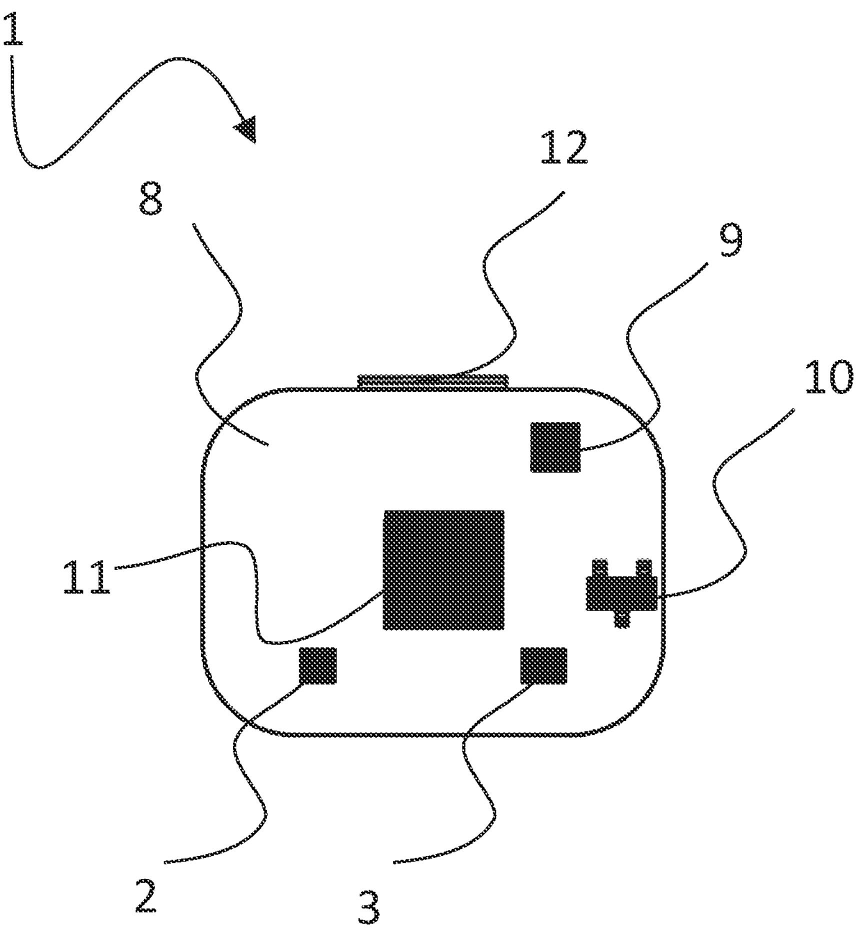
FIG. 3: shows a schematically illustrated internal construction of the maintenance indicator according to the embodiment in accordance with FIG. 1.

FIG. 3 shows, by way of example, the internal construction of the maintenance indicator 1, i.e. without housing 4. Thus, the maintenance indicator 1 comprises a carrier circuit board 8. The carrier circuit board 8 comprises an acceleration sensor 9, a magnet-sensitive sensor 10, a microcontroller 11, the data light-emitting diode 2 and the clock light-emitting diode 3 in its region shown in the plan view in accordance with FIG. 3. On the back side, the carrier circuit board 8 carries a battery 12; in portions, the battery 12 protrudes beyond the carrier circuit board 8 according to the plan view chosen in FIG. 3.

The microcontroller 11 processes signals received by the acceleration sensor 9 and the magnet-sensitive sensor 10. For example, once a minimum rotational acceleration has been registered by the acceleration sensor 9, the microcontroller 11 counts operating cycles of the component 100, shown in FIG. 5, of a cutting tool and no longer counts operating cycles after this minimum acceleration has been undershot. The piece of maintenance information obtained thus is encoded in a plurality of information bit strings by the microcontroller 11 in binary fashion according to the ASCII code, and said microcontroller stores these information bit strings. At the same time, the microcontroller stores one or more announcement signals in binary fashion according to the ASCII code, on the basis of a non-printable character in each case.

The microcontroller 11 registers when the magnet-sensitive sensor 10 senses a magnetic field strength of a given minimum field strength and activates the data light-emitting diode 2 and the clock light-emitting diode 3 such that both of these flash, as described with respect to FIG. 1 and FIG. 2.

The microcontroller 11 activates the data light-emitting diode 2 or the clock light-emitting diode 3 such that at least one of these shines continuously, i.e. a warning signal which can be registered directly by humans in respect of its information content is created, should the microcontroller 11 have counted that the number of operating cycles has exceeded a minimum value stored therein.

The battery 12 supplies electrical power to the maintenance indicator 1 and its electronic components described in relation to FIG. 3. The power storage state of the battery 12 undershooting a minimum value is also registered by the microcontroller 11, such that the latter creates the described warning signal. The power storage state can also be a constituent of the piece of maintenance information, in addition to the registered and stored operating cycles, and can also be shown in a manner analogous to FIG. 2. The battery 12 is carried by the carrier circuit board 8 in reversibly detachable fashion.

The carrier circuit board 8 and hence the electronic components described in relation to FIG. 3 are embedded in a plastics mass (not depicted here), as is the acceleration sensor 9 on its own as well, with the battery 12 being kept accessible.

Figure 4A:
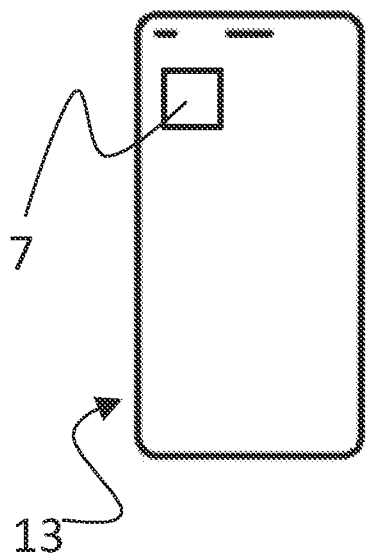
FIG. 4*a*: shows a back side view of a schematically illustrated smartphone.

FIG. 4*a* shows a back side of a smartphone 13. The photosensitive element 6 is integrated in the smartphone 13, with the result that the smartphone 13 is able to film the flashing of the maintenance indicator 1 described in relation to FIG. 1 and FIG. 2 and able to subject the films thus stored as well or the film to the bit string reconstruction and decoding described in relation to FIG. 2.

The smartphone 13 is able to transmit the filmed signals and/or the decoded information bit string or strings, i.e. sections of the piece of maintenance information, by radio or optically to another device or into a computer network, which also includes the Internet, in each case for data processing and data storage.

Figure 4B:
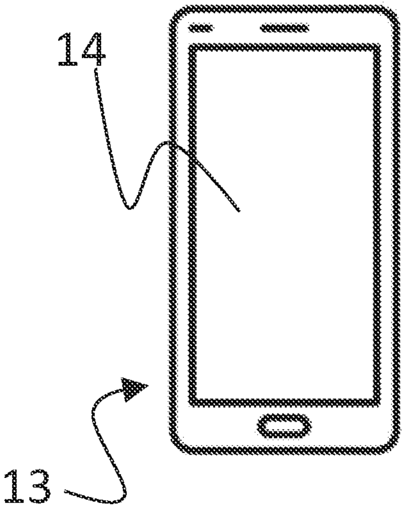
FIG. 4*b*: shows a front side view of the schematically illustrated smartphone in accordance with FIG. 4*a;*

FIG. 4*b* shows the front side of the smartphone 13. The front side contains a display 14 which shows the decoded information bit string if the smartphone 13 was activated in this respect.

However, it is also conceivable and possible that the photosensitive element 6 is integrated in a different mobile terminal for filming the flashing of the maintenance indicator 1, as described in relation to FIG. 1 and FIG. 2.

Figure 5:
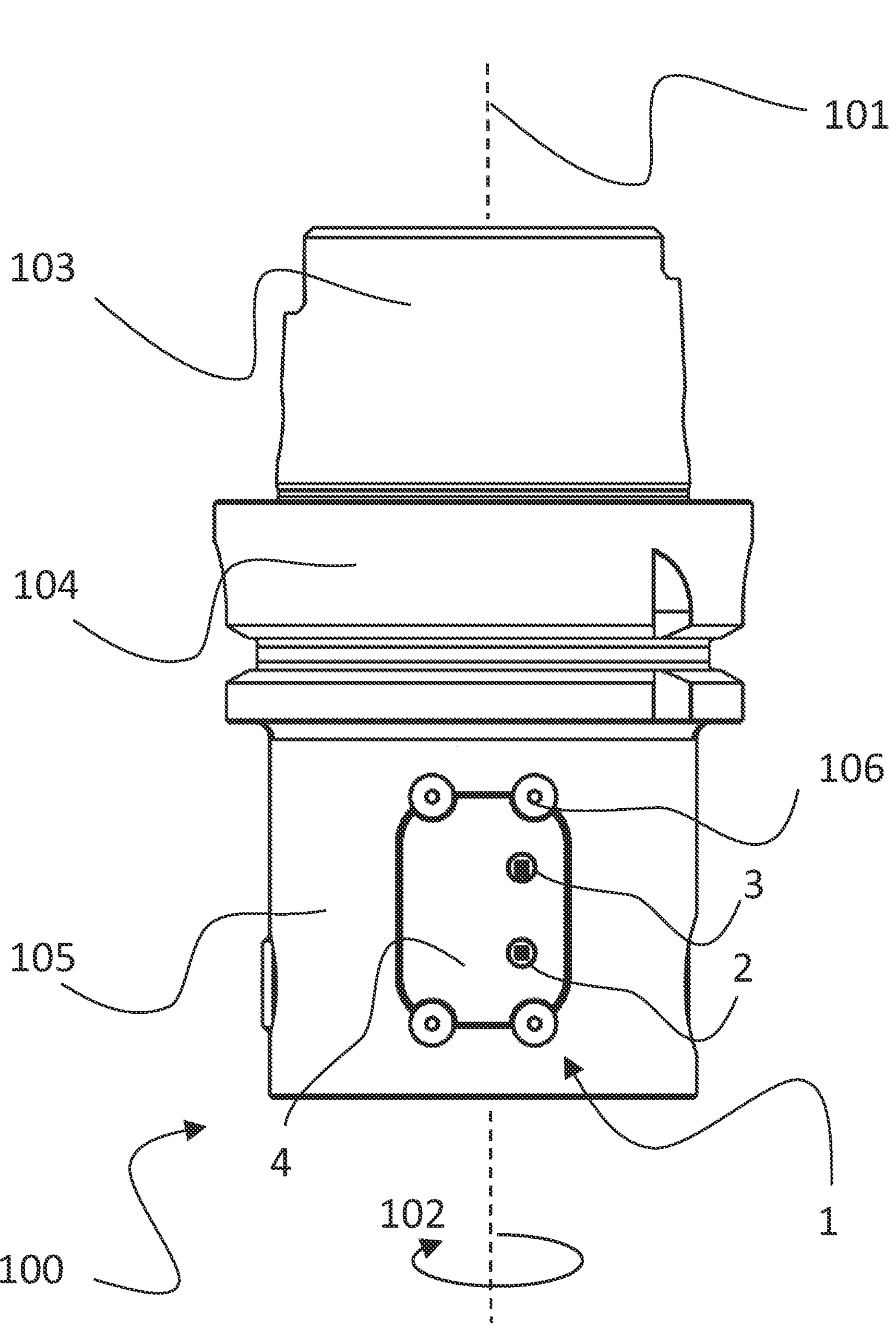
FIG. 5: shows a schematically illustrated component of a cutting tool in a side view, wherein the maintenance indicator according to the embodiment in accordance with FIG. 1 is fastened to the component in reversibly detachable fashion.

FIG. 5 shows a side view of a component 100 of a cutting tool. At least while a metallic workpiece is cut, the component 100 is accelerated with respect to the axis of rotation 101 at a minimum acceleration of 15 m/s2 in the exemplary direction of rotation 102.

The component 100 comprises a spindle assembly portion 103, in which a machine spindle (not depicted here) can be inserted in a manner secured for corotation. The component 100 further comprises a stop collar 104 which abuts against a portion of the machine spindle (not depicted here) on the side of the machine spindle.

The component 100 further comprises a work portion 105 such that the stop collar 104 is arranged between the work portion 105 and the spindle assembly portion 103. During the cutting, the work portion 105 is arranged on the side of the metallic workpiece (not depicted here).

The maintenance indicator 1 comprises four screws 106 which are also shown in FIG. 1. The screws 106 fasten the maintenance indicator 1 in reversibly detachable fashion to the work portion 105, with the result that the maintenance indicator 1, as described in relation to FIGS. 1 to 3, counts the operating cycles of the component 100, i.e. the number of revolutions in relation to the axis of rotation 101, stores them in binary fashion and indicates this by way of the data light-emitting diode 2 emitting flashes, the latter if the maintenance indicator 1 was set in the activated display state described in relation to FIG. 1.

FIGS. 1, 2, 3 and 5 thus show a maintenance indicator 1 which indicates a piece of maintenance information in space-saving fashion by flashes from a data light-emitting diode 2 and that the piece of maintenance information displayed thus can be filmed by a photosensitive element 6 while maintaining an air gap 7 and can be rendered visible to a human on the basis thereof, specifically by way of a bit string reconstruction which, according to FIGS. 4*a* and 4*b*, is performed and shown by a smartphone 13, with the filmed announcement signal based on a non-printable ASCII character serving to allow the information signal to be identified interference-free. Flashing of the clock light-emitting diode 3 is optional in this case.

Instead of the light-emitting diodes 2 and 3, use can also be made of respective other luminous elements which can each be switched on and off on the basis of a bit state and which in the process shine in the visible wavelength range when switched on.

The invention claimed is:

1. A maintenance indicator, comprising:

a photosensitive element;

the maintenance indicator storing an information bit string, the information bit string encoding at least a section of a piece of maintenance information of a component of a cutting tool in binary, the information bit string having a plurality of information bits, and each information bit having an information bit state;

in an activated display state, the maintenance indicator emitting flashes following the information bit states of the information bit string and thus displaying an information signal;

in the activated display state, the maintenance indicator displaying an announcement signal, the announcement signal announcing the information signal; and said photosensitive element configured to film the information signal while maintaining an air gap.

2. The maintenance indicator according to claim 1, wherein the maintenance indicator creates a warning signal once the piece of maintenance information has reached a specified information content.

3. The maintenance indicator according to claim 2, wherein the maintenance indicator displays the warning signal at least partially in the visible wavelength range.

4. The maintenance indicator according to claim 3, wherein the warning signal has a specified warning duration, the warning duration being longer than a specified information signal duration for the information signal.

5. The maintenance indicator according to claim 1, wherein, in the activated display state, the maintenance indicator emits flashes following an information bit reading clock, the information bit string being reconstructible from the information signal given the information bit reading clock.

6. The maintenance indicator according to claim 5, which further comprises a luminous element and a further luminous element, in the activated display state, said luminous element emitting flashes following the information bit states of the information bit string and said further luminous element emitting flashes following the information bit reading clock.

7. The maintenance indicator according to claim 1, which further comprises an indicator region of the maintenance indicator, said indicator region being configured and disposed to display the information signal, and said photosensitive element maintaining said air gap from said indicator region.

8. The maintenance indicator according to claim 1, wherein the maintenance indicator includes the component of the cutting tool or the maintenance indicator is the component of the cutting tool.

9. The maintenance indicator according to claim 1, which further comprises a magnet-sensitive activation sensor, the maintenance indicator having an indication state being set upon a magnetic field of a permanent magnet penetrating into said activation sensor and exceeding a specified magnetic field strength.

10. The maintenance indicator according to claim 1, wherein:

the maintenance indicator stores a further information bit string, the further information bit string encoding at least one further section of the piece of maintenance information from the component of the cutting tool in binary, and the further information bit string having a plurality of further information bits, each further information bit having an information bit state;

in the activated display state, the maintenance indicator emitting flashes following the information bit states of the further information bit string and thus displaying a further information signal after the information signal; and said photosensitive element configured to film the further information signal while maintaining the air gap.

11. The maintenance indicator according to claim 10, wherein, in the activated display state, the maintenance indicator repeatedly displays the announcement signal, and the repeatedly displayed announcement signal announces the further information signal.

12. The maintenance indicator according to claim 1, wherein:

the maintenance indicator stores an announcement bit string, the announcement bit string has a plurality of announcement bits, and each announcement bit has an announcement bit state; and in the activated display state, the maintenance indicator displays the announcement signal by virtue of the maintenance indicator emitting flashes following the announcement bit states of the announcement bit string.

13. The maintenance indicator according to claim 1, wherein, in the activated display state, the maintenance indicator displays the information signal at least partially in the visible wavelength range.

14. The maintenance indicator according to claim 1, wherein, in the activated display state, the maintenance indicator displays the announcement signal at least partially in the visible wavelength range.

15. The maintenance indicator according to claim 1, which further comprises:

a plastics mass of the maintenance indicator;

an acceleration sensor embedded in said plastics mass, said acceleration sensor configured and disposed to measure at least one of a rotational acceleration or a linear acceleration, the acceleration having a magnitude in a range from 15 $m/s^2$ to 7500 $m/s^2$; and the maintenance indicator configured and disposed to create the at least one section of the piece of maintenance information based on a minimum acceleration measured by said acceleration sensor.

* * * * *